US006876099B2

(12) United States Patent
Wobben

(10) Patent No.: US 6,876,099 B2
(45) Date of Patent: Apr. 5, 2005

(54) METHOD AND APPARATUS FOR MONITORING A WIND POWER INSTALLATION

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 10/471,264
(22) PCT Filed: Mar. 14, 2002
(86) PCT No.: PCT/EP02/02847
§ 371 (c)(1),
(2), (4) Date: Jan. 15, 2004
(87) PCT Pub. No.: WO02/075153
PCT Pub. Date: Sep. 26, 2002

(65) Prior Publication Data
US 2004/0108729 A1 Jun. 10, 2004

(30) Foreign Application Priority Data
Mar. 17, 2001 (DE) ......................... 101 13 038

(51) Int. Cl.[7] .............. F03D 9/00; H02P 9/04
(52) U.S. Cl. ......................... 290/44; 290/55
(58) Field of Search ............ 290/44, 55, 54

(56) References Cited

U.S. PATENT DOCUMENTS

| | | | | | |
|---|---|---|---|---|---|
| 4,410,806 | A | * | 10/1983 | Brulle | 290/44 |
| 4,420,692 | A | * | 12/1983 | Kos et al. | 290/44 |
| 5,978,972 | A | | 11/1999 | Stewart et al. | |

FOREIGN PATENT DOCUMENTS

| | | |
|---|---|---|
| DE | 33 08 566 | 11/1987 |
| EP | 0 223 729 | 11/1990 |
| EP | 0 490 805 A1 | 6/1992 |
| WO | WO 83/01490 | 4/1983 |
| WO | WO 99/36695 | 7/1999 |
| WO | WO 01/77524 | 10/2001 |

OTHER PUBLICATIONS

"Motion Analysis by Non–Contacting Camera/Computer Measurement System—A New Tool for Dynamic Field Testing of Wind Turbines", E. Hans Furnee et al., DEWI Magazine, No. 16, Feb. 2000, pp. 60–65.

"Dynamic Characterization of the AWT–26 Turbine for Variable Speed Operation", Larwood, Scott M., NREL, Jul. 1998, 19 pages.

"Periodic Power Pulsations from a Three–Bladed Wind Turbine", Thiringer T. et al., Department of Electrical Machines and Power Electronics, Chalmers University of Technology, IEEE Power Engineering Summer Meeting, Jul. 12–16, 1998, p7 pages.

"Dynamics and Control of Structural Loads of Wind Turbines", Thommy Ekelund, Control Engineering Laboratory, Chalmers University of Technology, Jun. 1998, pp. 1720–1724.

* cited by examiner

Primary Examiner—Darren Schuberg
Assistant Examiner—Heba Yousri Elkassabgi
(74) Attorney, Agent, or Firm—Neil A. Steinberg

(57) ABSTRACT

In one aspect, the present invention is a technique of, and a system for monitoring and/or controlling the operation of a wind power installation. In one embodiment, the present invention includes a control apparatus for operational management of the wind power installation using data which is representative of the oscillation of a support tower (for example, a pylon). The present invention also includes a device to detect oscillations of the support tower (using, for example, the acceleration measuring devices coupled to the support tower or resistance strain gauges disposed on the support tower). In this regard, the device to detect oscillations of the support tower may determine, for example, the oscillation travel and/or the absolute deflection of the support tower (for example, pylon that supports, among other things, the pod and rotor blades) in the upper part of the tower out of its rest position. In one embodiment, the operational management of the wind power installation or parts thereof is altered if the oscillation and/or the absolute deflection of the pylon exceeds a predeterminable first limit value.

22 Claims, 2 Drawing Sheets

METHOD AND APPARATUS FOR MONITORING A WIND POWER INSTALLATION

BACKGROUND OF THE INVENTION

The present invention concerns a method of controlling a wind power installation having a control apparatus for operational management of the wind power installation, in which the acceleration of the pylon is detected. The invention further concerns a wind power installation comprising a pylon, a control apparatus for operational management of the wind power installation and a device for detecting the acceleration of the pylon.

Disposed at the top of the pylon of a wind power installation of the horizontal-axis type are the generator, the entire drive train and the rotor, that is to say all movable parts of the wind power installation, which take energy from the wind and convert it into electrical energy.

Conversion is effected by the rotor being caused to rotate by the wind and by that rotary movement being transmitted to the generator or generators. Therefore the speed of rotation is dependent on the one hand on the wind and on the other hand on the aerodynamic properties of the wind power installation.

It will be seen from the foregoing that the pylon must therefore not only carry the rotor, the drive train and the generator (and the pod) but in addition it must also securely withstand the loadings which act thereon in operation. In addition the pylon must withstand high wind speeds, even if the wind power installation is already out of operation.

DE 33 08 566 and corresponding U.S. application U.S. Pat. No. 4,435,647 disclose a wind turbine installation in which arranged on the pylon is a motion measuring device which generates a motion signal, depending on how the top of the pylon is moving in operation.

DE 100 11 393 discloses a regulating system for a wind power installation, having means for the detection of measurement parameters which permit direct or indirect quantification of the current turbine loading and/or stressing which are dependent on location and weather, and a downstream-connected electronic signal processing arrangement which makes it possible for the reduction in power required in optimised wind power installations to be limited to the economic optimum which corresponds to the current operating conditions, in the range of the nominal wind speed and at high wind speeds.

DE 100 16 912 discloses operational management of offshore wind power installations, which is dependent on the natural frequency of the pylon, wherein firstly the respective critical natural frequencies of the installation and/or parts of the installation are determined, and thereafter the rotary speed range of the rotor in which excitation of the overall installation and/or individual parts of the installation occurs in the range of the critical natural frequencies thereof is determined, so that the wind power installation is operated only below or above the critical rotary speed range, passing quickly through the critical rotary speed range.

Therefore, given load situations in respect of which the pylon must be designed are derived from those loadings. Such loads are referred to as dimensioning loads and thus determine the dimensioning of the pylon. In turn, that dimensioning procedure also affords the oscillation characteristics of the pylon, its natural frequencies (the fundamental frequency and harmonics thereof) and so forth.

Now, for wind power installations there is a series of regulations which they have to observe. That also includes a 'Directive for Wind Power Installations', issued by the 'Deutsche Institut für Bautechnik (DIBt)' ['German Institute for Construction Technology'] in Berlin. That Directive sets forth inter alia a regulation regarding operational oscillation monitoring of the pylon. Accordingly, in an operating range in which the excitation frequency of the rotor is in a band width of the natural frequency of the pylon +/−5%, permanent operation without operational oscillation monitoring is inadmissible.

SUMMARY OF THE INVENTION

Therefore the object of the present invention is to develop a method and a wind power installation of the kind set forth in the opening part of this specification, in such a way as to implement reliable and efficient oscillation monitoring in order to open up the above-mentioned frequency range for operation of the wind power installation.

In one aspect, the present invention is based on the approach of not only detecting the oscillation frequencies—as in the state of the art—but in particular also the oscillation amplitudes, that is to say ascertaining the oscillation travel. Finally a wind power installation can be also operated in a critical frequency range as long as there the oscillation amplitudes do not exceed a given limit value.

The invention is based on the realisation that, in regard to all non-forced oscillations of the pylon, the oscillations at the first natural frequency of the pylon involve the greatest amplitude and thus represent the greatest loading for the pylon. Oscillations with harmonics of the first natural frequency are always of smaller amplitudes. Components of accelerations with a harmonic of the first natural frequency of the pylon, which have an influence in terms of ascertaining the oscillation travel but which admittedly are of a smaller amplitude, are however incorporated into the calculation on the basis of the first natural frequency and are therefore overvalued.

This means that the oscillation travel is substantially proportional to the loads and the loads derived from the oscillation travel are rather higher than the loads which actually act. The loads are therefore overvalued rather than undervalued. Load detection therefore affords an increased level of security.

In the case of oscillations which are parallel to the plane of the rotor and are therefore forced, the frequency of the oscillation can be significantly below the first natural frequency of the pylon. In that case, ascertaining the loading on the basis of the first natural frequency of the pylon is certain to result in undervaluation of the oscillation travel. In order to avoid that undervaluation the oscillation frequency is monitored in on-going operation and if necessary used for ascertaining the oscillation travel with a corrected value.

When an oscillation travel which exceeds a first limit value, which therefore exceeds a first load, is ascertained, a risk situation is recognised and the control apparatus reacts thereto. A risk situation is likewise recognised if a second limit value in respect of the oscillation travel is exceeded within a predeterminable period of time. In order reliably to eliminate that risk situation the installation can be stopped.

In addition, an object of the invention is attained by a wind power installation including a device for ascertaining the oscillation travel from the detected acceleration levels. That ascertained oscillation travel is then processed or evaluated in accordance with the method of the invention.

In a preferred development of the invention the wind power installation includes a device for monitoring the device for detecting levels of acceleration of the pylon. It is possible in that way to detect a failure on the part of oscillation monitoring and it is possible to initiate measures for eliminating the fault and for stopping the wind power installation so that oscillations cannot uncontrolledly occur.

Further advantageous embodiments of the invention are recited in the appendant claims.

BRIEF DESCRIPTION OF THE DRAWINGS

An embodiment of the invention is described in detail hereinafter with reference to the drawing in which.

DETAILED DESCRIPTION

Figure 1:
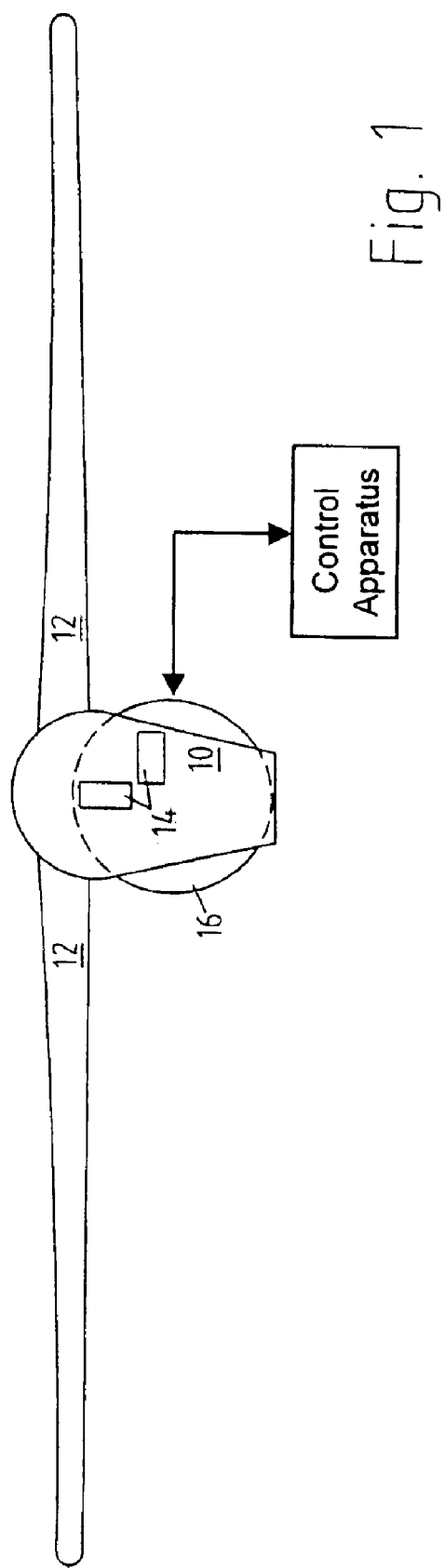
FIG. 1 shows a plan view of the pod with two acceleration sensors.

The plan view in FIG. 1 shows a pod 10 from which rotor blades 12 laterally extend. The pod 10 is arranged at the top of a support tower of the wind power installation (for example, pylon 16 which supports, among other things, pod 10 and rotor blades 12). Disposed in the interior of the pod 10 is a measuring device 14 with two acceleration sensors. Those acceleration sensors are oriented in a horizontal plane and are at a right angle to each other. By virtue of that arrangement, it is possible to detect support tower (hereinafter described in the context of a "pylon" which supports, among other things, pod 10 and rotor blades 12) oscillations in the corresponding directions, that is to say on the one hand substantially parallel to the rotor blade plane and on the other hand perpendicularly to the rotor blade plane.

Oscillations at the natural frequency of the pylon 16, which are excited for example by wind loads, are always oscillations in perpendicular relationship to the plane of the rotor, which are detected by a suitably oriented acceleration sensor 14. Forced oscillations which can occur for example due to unbalance at the rotor are oscillations which take place substantially parallel to the plane of the rotor. They are detected by a second acceleration sensor 14. In that case, such forced oscillations do not in any way take place at the first natural frequency of the pylon 16 or a harmonic thereof. They are forcibly imposed on the pylon 16 and can achieve such high amplitudes that an immediate shutdown is required.

In that respect monitoring of the oscillation travel in perpendicular relationship to the plane of the rotor also permits monitoring of the control of the angle of incidence of the rotor blades for, when the control of the rotor blade angle of incidence is operating satisfactorily, the oscillation characteristics of the pylon differ considerably from the oscillation characteristics when the control is not operating properly. Therefore, when the control of the rotor blade angle of incidence is not operating satisfactorily, oscillations also occur, which can result in shutdown.

The ascertained oscillation data can also be linked to the wind direction data so that it is also possible to ascertain a relationship as to whether greater oscillation travels have occurred when given wind directions are involved, than when other wind directions occur. Finally under some circumstances the landscape geography around the wind power installation also has effects—with the wind speed remaining the same—, depending on the direction from which the wind is blowing.

Figure 2:
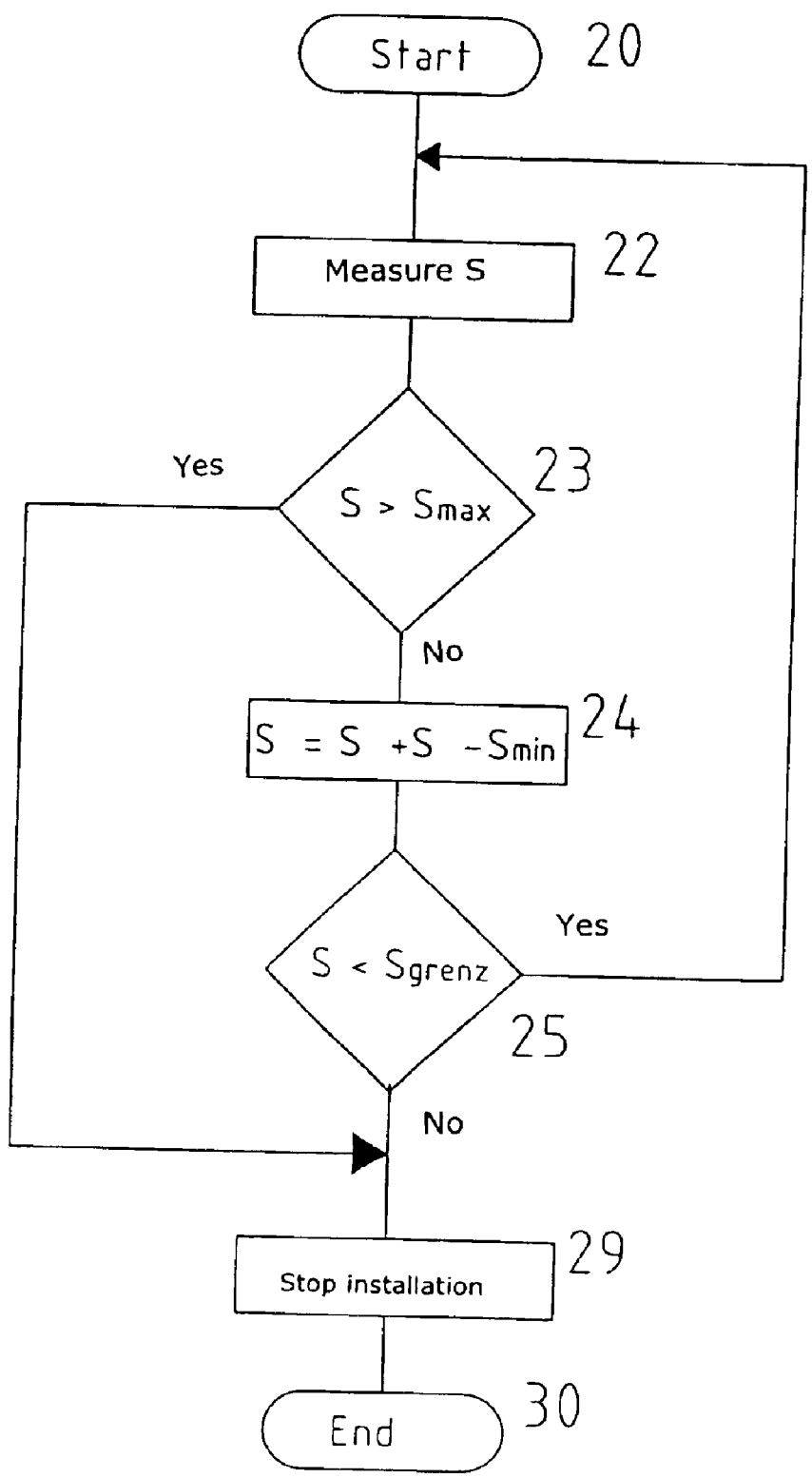
FIG. 2 shows a flow chart of the control process in a first embodiment of the invention.

FIG. 2 shows a flow chart which illustrates the procedure involved in the method according to the invention of controlling the wind power installation. The procedure begins with step 20. Subsequent step 22 involves detection of the oscillation of the pylon by the acceleration sensors 10, 14. Oscillation detection is effected for a period of time of 20 seconds. In that case, all accelerations are cumulated in those 20 seconds. After the expiry of that period of time, the effective value of the oscillation travel at the height of the hub is calculated from the sum of all accelerations and the first natural frequency of the pylon, in accordance with the formula $S(eff)=a(eff)/?^2$. Therein $S(eff)$ is the effective value of the pylon oscillation travel, $a(eff)$ is the effective value of all accelerations over a time interval of 20 seconds and $u^2$ is the square of $2?f$, wherein f represents the first natural frequency of the pylon. The value of $S(eff)$ is then multiplied by v2 in order to obtain the oscillation amplitude, that is to say the average deflection of the pylon from the rest position.

The first natural frequency of the pylon is generally relatively precisely known by measurements or calculations so that this value is firstly used for calculation of the oscillation travel when the installation is freshly brought into operation. As however the actual natural frequency of the pylon can deviate from the theoretical value in dependence on manufacture-induced tolerances in terms of the stiffness of the pylon or different kinds of foundations, the natural frequency of the pylon which is used in the calculations is gradually corrected by the control apparatus when pylon oscillations occur, by assessment of the period duration of the signal from the acceleration sensors. In that way measurement of the oscillation travel is adapted to the respective conditions of an installation.

For the further progress of the method, a series of limit values are also established, which are taken into account in the context of evaluation of the detected oscillation travel. A first limit value $S_{max}$ determines a maximum admissible oscillation travel. Let this be 500 mm in the present example. A second limit value defines a minimum admissible oscillation travel $S_{min}$. Let this be 220 mm in the present example. A third limit value determines the shutdown limit and is always used as a shutdown criterion when admittedly the first limit value $S_{max}$ is not exceeded but the second limit value $S_{min}$ is exceeded. That third limit value is identified as $S_{grenz}$ and its numerical unit-less value is for example 1 612 800.

Step 23 of the flow chart in FIG. 2 now involves checking whether the ascertained oscillation travel exceeds the first limit value $S_{max}$. If that is the case in step 29 the installation is immediately stopped and the procedure is halted.

If the checking operation in step 23 shows that the oscillation travel does not exceed the first limit value $S_{max}$, then step 24 of the flow chart involves forming the sum of the squares of the total oscillation travels. For that purpose the oscillation travel S detected in the time interval is squared and the square of the second limit value $S_{min}$, that is to say $S_{min}^2$, is subtracted therefrom. The resulting difference is added to the sum already ascertained in the preceding intervals.

That affords shutdown of the installation at the earliest if the measured oscillation travel over 8 measurement intervals is equal to the maximum admissible oscillation travel $S_{max}$. Oscillation travels which are between the minimum and the maximum oscillation travel result in an overproportional curtailment of the shutdown times due to the square sum formation and the dependency of the amplitude of the oscillation travel. If the value falls below the minimum oscillation travel (second limit value $S_{min}$), the sum of the oscillation travel squares falls. If now the third limit value $S_{grenz}$ is reached or exceeded by the sum of the squares, the installation is again stopped.

It is also possible, instead of the installation being stopped immediately, for it to possibly also be operated in such a way that the first limit value $S_{max}$ thereafter immediately falls. For that purpose it is possible for example to implement adjustment of the rotor blades or to turn the pod out of the wind (store). One measure can also be that of increasing the rotor blade speed so that the installation passes out of the critical range of its natural frequency.

The present application refers in particular to the use of acceleration sensors for ascertaining the oscillation travel (oscillation amplitude). It is also possible to use other devices to ascertain the oscillation travel (amplitude). If necessary the man skilled in the art will make use of a device which is suitable for the respective use. As an alternative to the acceleration sensors and as an alternative to ascertaining the oscillation travel by means of acceleration sensors, it is also possible to implement optical measurement, although here that is usually quite expensive.

As an alternative to an acceleration measuring device, it is also possible to establish the oscillation of the pylon under some circumstances by resistance strain gauges at the base of the pylon of the wind power installation. For that purpose at least two resistance strain gauges should be mounted at the region of the base of the pylon displaced relative to each other approximately through 90°. Such resistance strain gauges can not only detect the elongation but also the compression of the material. In that respect, the greater the oscillation amplitude of the pylon, the greater is also the corresponding elongation/compression in the region of the resistance strain gauges which are preferably oriented in the main direction of the wind of the wind power installation. Such resistance strain gauges can be used not only to measure loadings on the pylon in the region of the base thereof, but also to derive the magnitude of the deflection of the pylon in the region of the pod or the top of the pylon, as the loading in the region of the base of the pylon also increases depending on the respective amplitude of deflection movement of the top of the pylon. It will be appreciated that the above-described resistance strain gauges (or another sensor which detects the loading on the pylon) could also be disposed in other regions of the pylon, for example also at a mid-height position on the pylon.

What is claimed is:

1. A method of controlling a wind power installation having a rotor and a support tower, the method comprising:
    detecting a movement of the support tower during operation of the wind power installation in at least two directions in a plane which is substantially horizontal with respect to the support tower;
    determining an amplitude of an oscillation of the support tower using the detected movement of the support tower; and
    adjusting the operation of the wind power installation if the amplitude of the oscillation of the support tower exceeds a predetermined threshold value.

2. The method of claim 1 wherein detecting the movement of the support tower includes detecting an acceleration of the support tower in a plane that is substantially horizontal with respect to the support tower.

3. The method of claim 1 wherein determining the amplitude of the oscillation of the support tower includes determining the amplitude of the oscillation of the support tower using a first natural frequency of the oscillation.

4. The method of claim 1 wherein adjusting the operation of the wind power installation if the amplitude of the oscillation of the support tower exceeds a predetermined threshold value includes adjusting a setting of the rotor.

5. The method of claim 1 wherein adjusting the operation of the wind power installation if the amplitude of the oscillation of the support tower exceeds a predetermined threshold value includes adjusting the operation of the wind power installation if the amplitude of the oscillation of the support tower exceeds a predetermined threshold value within a predetermined period of time.

6. The method of claim 5 wherein the predetermined period of time depends on the amplitude of the oscillation.

7. The method of claim 1 wherein adjusting the operation of the wind power installation includes stopping the rotor if the amplitude of the oscillation of the support tower exceeds the predetermined threshold value.

8. The method of claim 1 wherein determining the amplitude of an oscillation of the support tower using the detected movement of the support tower in at least two directions further includes using at least one value that is predetermined and corrected, during operation, on the basis of measured values.

9. The method of claim 1 wherein detecting a movement of the support tower during operation of the wind power installation in at least two directions in a plane that is substantially horizontal with respect to the support tower includes detecting the movement of the support tower during a predetermined period of time.

10. The method of claim 1 wherein detecting a movement of the support tower during operation of the wind power installation includes detecting movement of the support tower using acceleration sensors that are disposed and oriented on the support tower to permit detecting a movement of the support tower during operation of the wind power installation in at least two directions in a plane which is substantially horizontal with respect to the support tower.

11. The method of claim 1 wherein detecting a movement of the support tower during operation of the wind power installation includes detecting movement of the support tower using first and second acceleration sensors that are disposed on the support tower and oriented in the horizontal plane wherein the first acceleration sensor is disposed on the tower at a right angle with respect to the second acceleration sensor.

12. The method of claim 1 wherein detecting a movement of the support tower during operation of the wind power installation includes detecting movement of the support tower using first and second acceleration sensors that are disposed on the support tower wherein the first acceleration sensor is disposed in a plane that is substantially parallel to a rotor plane and the second acceleration sensor is disposed in a plane that is substantially perpendicular to the rotor plane.

13. The method of claim 1 wherein detecting a movement of the support tower during operation of the wind power installation includes detecting movement of the support tower using resistance strain gauges that are disposed and oriented on the support tower to permit detecting a movement of the support tower during operation of the wind power installation in at least two directions in a plane which is substantially horizontal with respect to the support tower.

14. The method of claim 1 wherein detecting a movement of the support tower during operation of the wind power installation includes detecting movement of the support tower by sensing the elongation and/or compression of the support tower during operation of the wind power installation.

15. A wind power installation comprising:

a support tower;

a rotor, disposed on the support tower;

movement sensors, disposed on the support tower, to provide data which is representative of the movement of the support tower in at least two directions in a plane that is substantially horizontal with regard to the support tower; and control apparatus, coupled to the movement sensors, to:
  determine an amplitude of an oscillation of the support tower using the data which is representative of the movement of the support tower in at least two directions in a plane that is substantially horizontal with regard to the support tower; and
  adjust the operation of the wind power installation if the amplitude of the oscillation of the support tower exceeds a predetermined threshold value.

16. The wind power installation of claim 15 wherein the movement sensors detect an acceleration of the support tower in a plane that is substantially horizontal with respect to the support tower.

17. The wind power installation of claim 16 wherein the movement sensors are acceleration sensors disposed on the support tower.

18. The wind power installation of claim 17 wherein acceleration sensors include first and second acceleration sensors that are oriented in the horizontal plane wherein the first acceleration sensor is disposed at a right angle with respect to the second acceleration sensor.

19. The wind power installation of claim 17 wherein acceleration sensors include first and second acceleration sensors that are oriented in the horizontal plane wherein the first acceleration sensor is disposed in a plane that is substantially parallel to a rotor plane and the second acceleration sensor is disposed in a plane that is substantially perpendicular to the rotor plane.

20. The wind power installation of claim 15 wherein the movement sensors are resistance strain gauges.

21. The power installation of claim 15 wherein control apparatus adjusts the operation of the wind power installation if the amplitude of the oscillation of the support tower exceeds a predetermined threshold value within a predetermined period of time.

22. The power installation of claim 21 wherein the predetermined period of time depends on the amplitude of the oscillation.

* * * * *